M. D. SELDEN & R. L. GRAVES.
AUTOMATIC ELECTRIC SPEED REGULATOR.
APPLICATION FILED FEB. 28, 1911.
1,040,586.
Patented Oct. 8, 1912.
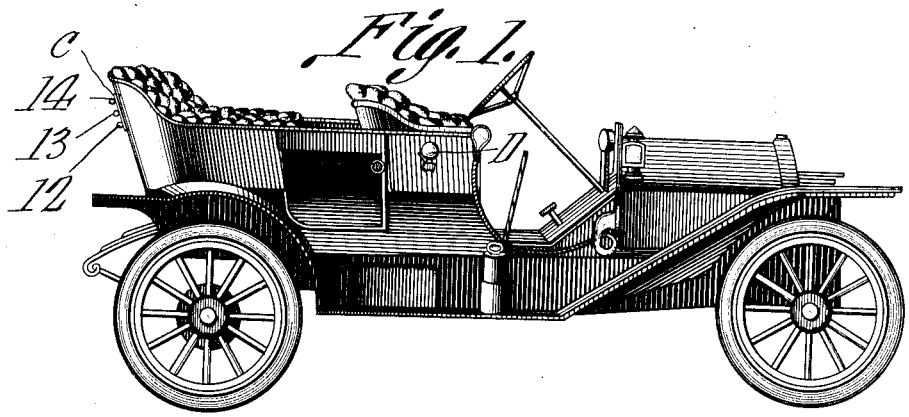
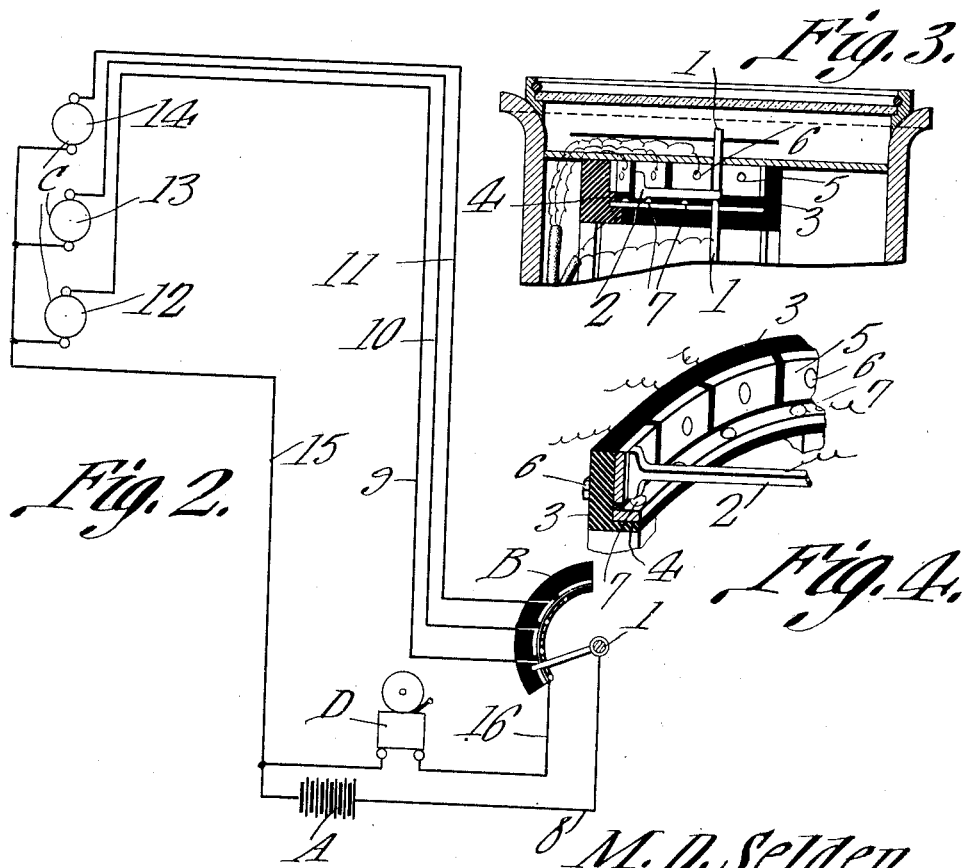
Witnesses
M. D. Selden AND
R. L. Graves
Inventors
by C. A. Snow & Co.
Attorneys

UNITED STATES PATENT OFFICE.

METELLUS D. SELDEN AND RICHMOND L. GRAVES, OF MEMPHIS, TENNESSEE.

AUTOMATIC ELECTRIC SPEED-REGULATOR.

1,040,586.

Specification of Letters Patent.

Patented Oct. 8, 1912.

Application filed February 28, 1911. Serial No. 611,422.

*To all whom it may concern:*

Be it known that we, METELLUS D. SELDEN and RICHMOND L. GRAVES, citizens of the United States, residing at Memphis, in the county of Shelby, State of Tennessee, have invented a new and useful Automatic Electric Speed-Regulator, of which the following is a specification.

This invention relates to indicators and more particularly to the class of speed indicators.

The principal object of the present invention is the provision of a device of the above stated character which, when applied to an automobile or other vehicle of like character will readily give warning of the various speeds at which the vehicle is moving. Another object of the invention is the provision of a speed indicator arranged upon an automobile or like vehicle and including an audible signal which is actuated by the speedometer of the machine during the travel of the machine at various speeds.

A further object of the invention is the provision of a speed indicator arranged upon an automobile or like vehicle, and including a plurality of contrasting signals in the form of glow lamps, and an audible signal; the contrasting lamps being arranged on the rear of the vehicle to warn the public of the speed at which the vehicle is proceeding, and the audible signal giving notice to the operator of said vehicle as he exceeds the various speed limits within a town or city.

With these and other objects in view as will appear as the description proceeds, the invention comprises the various novel features of construction and arrangement of parts which will be more fully described and set forth with particularity in the appended claim.

Referring to the drawings,—Figure 1 is a view showing in elevation a motor car and the various parts of the device arranged thereon; Fig. 2 is a view showing diagrammatically the arrangement of the various parts and the circuits comprising the speed indicator; Fig. 3 is a detail sectional view of a circuit closing device and the upper portion of an ordinary speedometer; and Fig. 4 is a detail perspective view of the stationary contacts and the support therefor.

Similar characters of reference are used to denote like parts throughout the accompanying drawings in the annexed specification.

Our improved speed indicator, as will be seen by reference to Fig. 2, comprises a plurality of electrical circuits including a battery or other suitable source of supply A, a circuit-closing device B and a plurality of glow lamps C. Connected with the circuit-closing device and return wire of the electrical circuit is a shunt including an audible signal D, such as a bell or the like.

Suitably connected with the indicator shaft or spindle 1 of an ordinary speedometer is a laterally projecting movable contact consisting of a circuit closing arm 2. Arranged circumferentially of the indicator shaft 1 is a contact supporting member 3 which is provided at its lower edge with an inwardly projecting flange 4, the said member being formed of suitable insulating material such as wood fiber, vulcanized rubber or the like. Arranged on the inner circumferential face of the member or support 3 is a plurality of contact strips or sectors 5, which are suitably spaced apart throughout the length of the member 3 and are securely held in place by transversely extending screws or bolts 6. The laterally and inwardly projecting flange of the member 3 is provided adjacent one end of the contact strips 5 with a series of contacts 7 extending upwardly through the said flange into the path of movement of the circuit-closing arm 2. By reference to Fig. 3 it will be seen that the end of the contact arm 2 bears against the inner circumferential face of the member 3, while the lower portion of the end of the arm bears upon the upper face of the laterally extending flange 4 of the member 6, and as the contact arm moves forward it will successively make contact with the contact strips 5 and the contacts 7.

The battery A is connected to the indicator shaft carrying the movable contact arm 2 by means of a wire 8. Connected to each of the respective stationary contacts 5 is one of the wires 9, 10, and 11 each of which is connected to one of a plurality of glow lamps 12, 13 and 14, respectively, which latter are connected in parallel to a common return wire 15 which is connected to the battery A. Connected in series with each of the contacts 7 is a wire 16 having the bell D connected therewith, which is in turn connected to the return wire 15. It is to be understood that each of the glow lamps 12, 13, 14 represents a predetermined speed of the automobile or other vehicle. For instance, the glow lamps 12, 13 and 14 may be colored white, green, and red, respectively, thus representing, say 8, 12 and 20 miles per hour, respectively, whereby the illumination of any one of the lights will be a definite indication of the speed at which the automobile is traveling.

It is to be noted by reference to Fig. 2 that as the vehicle proceeds forward, the indicator shaft 1 will be revolved according to the speed at which the vehicle is moving thus bringing the end of the movable contact arm 2 into engagement with the contact strips or segments 5 and the contacts 7 in the forward movement of the contact supporting member 3. Should the vehicle be moved forward, say at the rate of eight miles per hour, the movable contact or circuit-closing arm 2 will move forward into engagement with the first contact strip 5 arranged upon the member 3, thus permitting current to flow from the battery A through the wire 8, the indicator shaft 1, the movable contact 2, wire 9, glow lamps 12, and through the return wire 15 through the battery A, thus lighting the lamp 12 which will be an indication of the speed at which the vehicle is moving. As the speed of the vehicle is increased the contact arm 2 will move forward into engagement with each succeeding contact strip 5 whereby each consecutive circuit including a glow lamp will be closed to light the light of that particular circuit. By the arrangement of the shunted circuit including the audible signal D with respect to the circuit, the driver or operator of the vehicle will be momentarily warned by the sounding of the signal as he exceeds the various speed limits. As the contact arm 2 moves forward away from the first contact strip 5 into engagement with the next succeeding strip 5, it will make contact with one of the contacts 7 arranged adjacent the beginning of the last mentioned contact strip 5, whereby current will flow from the battery A through the wire 8, the indicator shaft 1, the movable contact arm 2, the said contact 7, through the wire 16 and bell D back to the battery A thus giving the driver warning of the change of speeds of the vehicle.

From the foregoing description taken in connection with the accompanying drawings, the advantages of construction and method of operation will be readily apparent to those skilled in the art to which the invention relates, and while we have described the principal operation of the invention, together with the device which we now consider to be the best embodiment thereof, we desire to have it understood that such changes of construction may be made when desired as within the scope of the appended claim.

Having thus described the invention, what we claim as new is:—

In an automatic speed indicator and alarm, the combination with a speedometer, of a segment of insulation disposed in circumferential relation to the pointer arbor thereof, a plurality of contact plates mounted in electrically insulated relation in one wall of said segment, a plurality of contact points disposed at right angles to the plate also carried by said segment of insulation, one point to each of the plates and disposed to have a lesser contact surface than the plate, a contact arm carried by the pointer arbor and provided with a T-shaped head to engage the contact plate and the contact points of the segment, a battery, a conductor wire connected to the battery and the contact arm, an audible signal connected to the contact points and to the other side of the battery, a plurality of conductors one to each contact plate, a visual signal to each contact plate connected to its respective conductor, and a single conductor common to all of said visual signals and connected to the battery.

In testimony that we claim the foregoing as our own, we have hereto affixed our signatures in the presence of two witnesses.

METELLUS D. SELDEN.
RICHMOND L. GRAVES.

Witnesses:
S. L. CARTER,
L. O. LINDGREN.